United States Patent [19]

Adams

[11] 4,037,858
[45] July 26, 1977

[54] PORTABLE LUGGAGE CARRIER

[76] Inventor: John F. Adams, 55 Lee Road, Chestnut Hill, Mass. 02167

[21] Appl. No.: 623,600

[22] Filed: Oct. 20, 1975

[51] Int. Cl.² ............................................. B62B 3/02
[52] U.S. Cl. .................................. 280/652; 280/47.29
[58] Field of Search ............... 224/45 H; 280/639, 40, 280/652, 651, 655, 47.28, 47.27, 43.17, 35, 37, 47.29, DIG. 3

[56] References Cited

U.S. PATENT DOCUMENTS

| 2,466,149 | 4/1949 | Burg ............................... 280/42.28 X |
| 2,605,116 | 7/1952 | Alexander ......................... 280/651 X |
| 2,721,668 | 10/1955 | Elsner ............................ 280/47.27 X |
| 2,729,460 | 1/1956 | Forman .............................. 280/40 |
| 3,612,563 | 10/1971 | Kazmark ............................ 280/655 |
| 3,892,429 | 7/1975 | Dalmy ............................ 280/651 X |

Primary Examiner—Robert J. Spar
Assistant Examiner—Donald W. Underwood
Attorney, Agent, or Firm—Thompson, Birch, Gauthier & Samuels

[57] ABSTRACT

A portable luggage carrier for suitcases which has two wheels and is pulled along behind the traveler. The carrier has a telescoping detachable handle and two folding support fingers above the wheels on which the suitcases rest. The carrier can be folded into a slender, easily stowable package.

8 Claims, 2 Drawing Figures

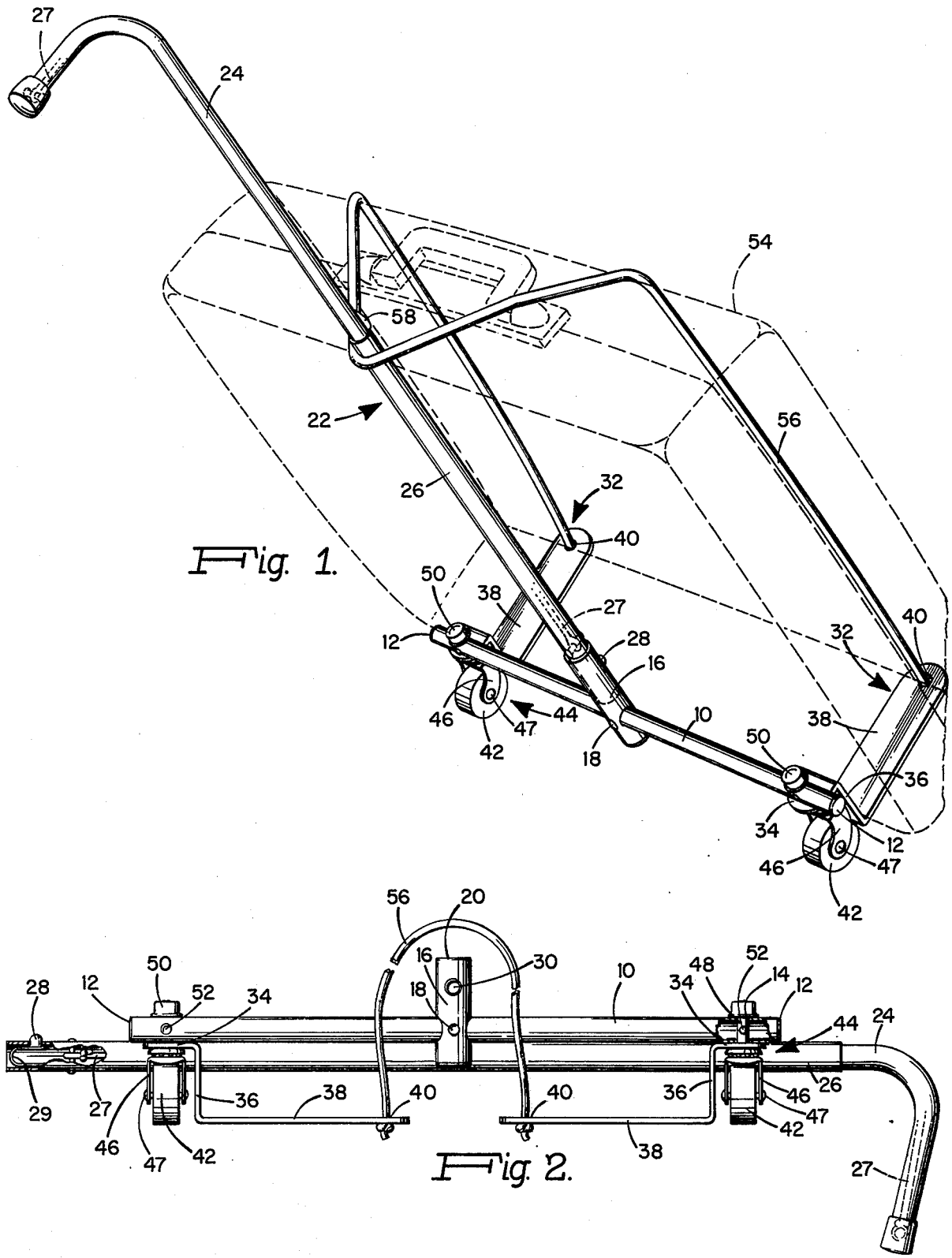

PORTABLE LUGGAGE CARRIER

BACKGROUND OF THE INVENTION

Travelers on buses, trains, airplanes, and the like are frequently burdened with the job of carrying heavy suitcases to and from their means of transportation. This unpleasant job is particularly burdensome for women and older travelers. Travelers with heavy suitcases have often strained their muscles or even caused more serious injuries trying to carry (and often hurry with) their heavy luggage.

The need has long existed for a device which could be used by the traveler to transport such heavy luggage from place to place which requires only a small effort to be exerted by the traveler.

It is an object of this invention to provide a portable luggage carrier upon which luggage can be secured, which can be pulled with little effort, which is lightweight, which is quiet, which does not mar the luggage, and which is quite inexpensive to manufacture.

It is a further object of this invention to provide a portable luggage carrier which, when not in use, can be folded into a slender package that may be carried by the traveler or may be easily stowed in the luggage or elsewhere.

SUMMARY OF THE INVENTION

The portable luggage carrier of this invention is designed to carry one or two suitcases. The carrier rolls on two wheels and is pulled along behind the traveler. The carrier can be folded into a compact unit by folding the support fingers, by detaching and telescoping the handle and by winding the cord around the detached elements. The carrier may then be optionally placed in a carrying case.

DESCRIPTION OF THE DRAWINGS

FIG. 1 is a perspective view of the portable luggage carrier of this invention showing a suitcase (in dotted) loaded thereon.

FIG. 2 is a front elevation of the luggage carrier in its folded storage position with the handle detached and telescoped and the support fingers folded.

DESCRIPTION OF THE PREFERRED EMBODIMENT

The portable luggage carrier is shown in its unfolded operative position in FIG. 1 and in its folded storage position in FIG. 2. The carrier has a tubular aluminum horizontal beam 10 which has two capped ends 12. Each end 12 has a vertical aperture 14 formed therein adjacent to the end.

A tubular aluminum socket 16 is fixed vertically to the mid-point of the horizontal beam 10 by a transverse rivet 18. The socket 16 has an upwardly opening mouth 20. A two section telescoping vertical handle 22 is dimensioned to fit into mouth 20 of socket 16. Handle 22 has an upper section 24 which has a capped curved end, and a lower section 26 which has an end that fits smoothly into the socket. In the preferred embodiment, an internal cord 27 links the two handle sections together; a spring-loaded, depressible, umbrella-type retaining element 58 keeps the two handle sections apart; and lower section 26 is fitted with a depressible button 28 mounted on a spring 29 which resiliently protrudes through socket hole 30 when the handle 22 is inserted into socket 16. The upper handle section rotates relative to the lower handle section to make it more comfortable to turn the carrier when pulling it.

Two individual horizontal support fingers 32 are each Z-shaped with right angle bends. Each finger has a first horizontal portion 34 which has a vertical aperture (unshown), a contiguous vertical portion 36 which is parallel to the handle 22, and a contiguous second horizontal portion 38 which has a vertical aperture 40 at its free end. The first horizontal portion 34 is parallel to the second horizontal portion 38.

Two individual wheels 42 are carried by two individual wheel housings 44. Each wheel housing 44 includes a bracket 46 mounting an axle 47 on which wheel 42 is carried. The wheel housing 44 also has an upwardly extending shaft 48. Conventional caster wheel units can be used if desired, and the bracket 46 can be fixed against rotation relative to the shaft 48 or permitted to rotate as design considerations dictate. In the preferred embodiment, the bracket 46 is fixed against rotation relative to the shaft 48.

Each upwardly extending shaft 48 is positioned vertically and extends through the unshown aperture in the first horizontal portion 34 of support finger 32. The shaft 48 then extends upwardly through aperture 14 in the horizontal beam 10. In order to prevent wheel housing 44 from moving downwardly relative to the horizontal beam 10, a cap fastener 50 is driven over and fixed to the top of shaft 48. This fastening arrangement is relatively tight, but sufficiently loose to permit the support fingers 32 to resistingly pivot on shafts 48 from the FIG. 1 operative position to the FIG. 2 storage position and vice versa. In order to prevent each wheel housing 44 from rotating, a transverse rivet 52 is passed through horizontal beam 10 and through shaft 48.

In order to secure a suitcase 54 to the luggage carrier, an elastic cord 56 is fixed to the free ends of each support finger 32 by being passed through apertures 40 and being knotted underneath. The cord is stretched over the suitcase and is looped over and around handle 22.

In use, the luggage carrier is moved from the storage position (FIG. 2) to the operative position (FIG. 1) by first unwrapping cord 56 from around the loose elements. Then, the handle is extended and the lower section 26 is inserted into socket 16 until it is locked therein when button 28 pops through socket hole 30. Then, the two support fingers 32 are pivoted to the open position. The carrier is now ready to receive a suitcase over which cord 56 is stretched and secured behind handle 22. This is the operative arrangement shown in FIG. 1.

To move from the operative position to the storage position, the suitcase is removed; the support fingers are folded; the button is depressed and the handle is removed from the socket; the handle is collapsed; the loose elements are arranged as shown in FIG. 2 and the cord is wrapped around them. Optionally, the FIG. 2 assembly can be placed in a carrying case.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. A portable luggage carrier comprising:

a. a horizontal beam having a vertical aperture formed therein adjacent to each end thereof;
b. a vertical socket affixed to said horizontal beam at the approximate mid-point thereof, said socket having an upwardly-extending opening;
c. two individual horizontal support fingers each having a vertical aperture formed therein adjacent to one end thereof;
d. two individual wheel housings each having a wheel mounted for rotation therein, each said housing having a vertical shaft extending upwardly through one of said support finger apertures and through one of said horizontal beam apertures, said support fingers pivoting about said vertical shafts independently of the wheel housings and between an unfolded operative position and a folded storage position;
e. means for engaging the tops of said shafts to prevent downward movement of said wheel housings relative to said horizontal beam;
f. an extendible vertical handle having at least two telescoping tubular sections, said handle being detachably mounted in said socket; and
g. a flexible length of elastic cord for securing luggage placed on said carrier, said cord running between the other ends of said support fingers and extending upwardly over the luggage and then around said handle.

2. The portable luggage carrier of claim 1 wherein said horizontal beam is a tube.

3. The portable luggage carrier of claim 1 wherein said socket is a tubular section riveted to said horizontal beam.

4. The portable luggage carrier of claim 1 wherein said support finger has a Z-shape with each bend being a right angle.

5. The portable luggage carrier of claim 4 wherein said support fingers have a first horizontal portion through which said wheel housing shaft extends, a vertical portion parallel to said handle, and a second horizontal portion to which said cord is secured.

6. The portable luggage carrier of claim 1 further having means cooperating with said horizontal beam for fixing said wheel housings against rotation about a vertical axis.

7. The portable luggage carrier of claim 1 wherein said two telescoping handle sections are rotatable relative to each other.

8. The portable luggage carrier of claim 1 wherein said extendible handle has a spring-loaded, depressible, umbrella-type retaining element positioned on one of said telescoping sections, said retaining element engaging said other telescoping section to prevent unwanted telescoping of the two said sections.

* * * * *